US011883792B1

(12) United States Patent
Saleem et al.

(10) Patent No.: US 11,883,792 B1
(45) Date of Patent: Jan. 30, 2024

(54) PROCESS FOR PREPARING A POLYPROPYLENE-BASED SPONGE-LIKE POROUS THIN FILM

(71) Applicant: KING FAISAL UNIVERSITY, Al-Ahsa (SA)

(72) Inventors: Junaid Saleem, Al-Ahsa (SA); Safdar Hossain S K, Al-Ahsa (SA); Zubair Khalid Baig Moghal, Al-Ahsa (SA); Gordan McKay, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/241,612

(22) Filed: Sep. 1, 2023

(51) Int. Cl.
*B01J 20/26* (2006.01)
*B01J 20/28* (2006.01)
(Continued)

(52) U.S. Cl.
CPC ....... *B01J 20/261* (2013.01); *B01J 20/28004* (2013.01); *B01J 20/28033* (2013.01); *B01J 20/3007* (2013.01); *B01J 20/3064* (2013.01); *B01J 20/3071* (2013.01); *C02F 1/285* (2013.01); *C08J 5/18* (2013.01); *C08J 9/26* (2013.01); *C02F 2101/32* (2013.01); *C02F 2103/007* (2013.01); *C02F 2303/16* (2013.01);
(Continued)

(58) Field of Classification Search
None
See application file for complete search history.

(56) References Cited

U.S. PATENT DOCUMENTS 4,332,854 A * 6/1982 Parker .................. E02B 15/101
428/377
5,834,385 A * 11/1998 Blaney .................... B32B 5/022
442/385

(Continued)

FOREIGN PATENT DOCUMENTS

EP        1216735 A2 *  6/2002   ......... B01D 17/0202

OTHER PUBLICATIONS

Elyashevich et al. (Physics of the Solid State, 2012, 54, 1907-1916). (Year: 2012).*

(Continued)

*Primary Examiner* — Clare M Perrin
(74) *Attorney, Agent, or Firm* — Nath, Goldberg & Meyer; Richard C. Litman (57) ABSTRACT

Sponge-like porous polypropylene thin film, and a method for preparing a sponge-like porous polypropylene thin film. The method includes dissolving polypropylene in an organic solvent to form a solution under reflux condition; adding a cavity forming agent to the solution and mixing the solution until the cavity forming agent is well-dispersed therein; applying the well-dispersed solution onto the solid substrate through spin coating to form a thin film on the solid substrate; peeling the thin film off the solid substrate; extracting the cavity forming agent from the peeled thin film by washing the peeled thin film in an aqueous or nonaqueous solvent, thereby obtaining a sponge-like porous polypropylene thin film with cavities, macro-voids, and micropores. The sponge-like porous polypropylene thin film is used as an oil sorbent. The sponge-like porous polypropylene thin film has about 400 to about 700 swellable cavities per $cm^2$.

18 Claims, 7 Drawing Sheets

(51) Int. Cl.
  *B01J 20/30* (2006.01)
  *C02F 1/28* (2023.01)
  *C08J 5/18* (2006.01)
  *C08J 9/26* (2006.01)
  *C09K 103/00* (2006.01)
  *C09K 3/32* (2006.01)
  *C02F 103/00* (2006.01)
  *C02F 101/32* (2006.01)

(52) U.S. Cl.
  CPC .... *C08J 2201/0446* (2013.01); *C08J 2323/12* (2013.01); *C09K 3/32* (2013.01)

(56) References Cited

U.S. PATENT DOCUMENTS

| | | | | |
|---|---|---|---|---|
| 6,136,750 | A * | 10/2000 | Ota | B41M 5/41 428/304.4 |
| 6,153,133 | A * | 11/2000 | Kaimai | B29C 48/08 264/210.4 |
| 6,228,316 | B1 * | 5/2001 | Moseley, III | C08J 5/18 264/509 |
| 2007/0178324 | A1 * | 8/2007 | Masuda | B29C 48/08 428/500 |
| 2008/0299380 | A1 * | 12/2008 | Choi | C08J 5/18 428/315.7 |
| 2014/0356730 | A1 * | 12/2014 | Sawada | H01M 50/491 429/247 |
| 2021/0095110 | A1 * | 4/2021 | Huang | B29C 55/04 |
| 2021/0126319 | A1 * | 4/2021 | Summey | H01M 50/457 |
| 2022/0089822 | A1 * | 3/2022 | Yamada | B29C 55/14 |

OTHER PUBLICATIONS

Castejon et al. (Polymers, 2018, 10, 1-21) (Year: 2018).*
Sadeghi et al. (Journal of Plastic Film & Sheeting, 2005, 21, 199-216). (Year: 2005).*
Yang et al. (European Polymer Journal, 2017, 91, 134-148). (Year: 2017).*
Zohrevand et al. (Polym Int, 2014, 63, 2052-2060). (Year: 2014).*
Machine translation of EP # 1216735A2 (Year: 2002).*
Junaid Saleem, et al., "Up-cycling plastic waste into swellable super-sorbents", Journal of Hazardous Materials, vol. 453, pp. 1-14, First available online Apr. 5, 2023.
Junaid Saleem, et al., "Reusable Macroporous Oil Sorbent Films from Plastic Wastes", Polymers 2022, 14(22), 4867, pp. 1-7, First available online Nov. 11, 2022.
Junaid Saleem, et al., "Development of Polymeric Aerogel using Plastic Wastes for Oil Cleanup from Wastewater", Proceedings of the World Congress on Engineering and Computer Science 2018, vol. II, First available online Dec. 21, 2018.
Junaid Saleem, et al., "Free-standing polypropylene porous thin films using energy efficient coating technique", Energy Reports, vol. 9, Supplement 3, pp. 31-39, First available online Jan. 2, 2023.

\* cited by examiner

FIG. 14

PROCESS FOR PREPARING A POLYPROPYLENE-BASED SPONGE-LIKE POROUS THIN FILM

FIELD AND BACKGROUND

The disclosure of the present application relates to a sponge-like porous polypropylene thin film, and particularly to a method for preparing a sponge-like, porous, and/or freestanding porous polypropylene thin film.

DESCRIPTION OF THE PRIOR ART

Pollution caused by oil spills on the water surface has been a major environmental concern, and one of the remedies to address this issue is the utilization of oil sorbents. The oil sorption mechanism comprises a wetting tendency of a sorbent, capillary action created through pores and macro-voids that attracts oil, capillary action inside micropores, cohesion between oil molecules at the surface of the sorbent and the oil molecules inside micropores and macro-voids, adhesion of the oil molecules on the surface of the sorbent, and the available surface volume/area of the sorbent. An effective sorbent provides high oil uptake and retention values, high selectivity, super-fast uptake kinetics, and sufficient mechanical strength to ensure practical application under different conditions.

Oil sorbents come in many shapes and sizes, such as films, sheets, pads, mats, sweeps, and blankets. They can be made from polypropylene nonwoven fabric to form a thin film of 10 µm to 30 µm. These films can be stacked to make a thick sorbent pad, as in the case of 3M-HP-255, 3M-156, Chemtex-BP-9W, and Alsorb. They are at times produced by spinning polypropylene using heat and air into long fluffy fibers or threads, then pressing the fibers together between hot rollers to get a flexible solid fabric thin film. Their thickness typically ranges from 5 mm to a few centimeters. Although their advantage tends to lie in the ease of use and the speed at which they absorb oil, their lower surface tends to sink into the water, thus triggering oil to be displaced towards the edges of the sheet, causing oil to penetrate into the pad through a small area on the pad edges. Moreover, for thin water-borne oil films, these pads and sheets pick up undesirable water as a portion of these materials floats below the oil surface, i.e., in the water. The minimum thickness of these pads is 5 mm, which forces a limit on the number of such pads which may be kept in a given space.

To solve this problem, several thin film sorbents with micropores have been made using polyolefins such as polyethylene and polypropylene. These polyolefin microporous thin films are made either by a wet extrusion or a dry extrusion process. The wet process comprises extruding polyolefin with a diluent at a high temperature to form a single pseudo-gel-like single phase, hot-pressing the pseudo-gel to produce a uniform sheet; uni-axially or bi-axially stretching the sheet, and extracting a diluent portion using an aqueous or nonaqueous solvent to create pores. Extraction of the diluent can be before or after the stretching step as per final requirements of the microporous thin film. The dry process comprises mixing a polyolefin with a pore-forming agent such as an inorganic filler or another polymer to produce a dispersion; hot-pressing the dispersion to produce a uniform sheet; stretching the sheet uniaxially or biaxially; and subjecting the resultant sheet to aqueous or nonaqueous solvent capable of dissolving pore-forming agent to create pores. However, there are two intrinsic issues with these films. First, due to the thickness of a freestanding single thin film being on average 10 µm and due to the film having a microporous structure, oil uptake capacity is limited. Secondly, the preparation method is energy-intensive, laborious, expensive, and involves a series of steps.

Thus, there is a need to provide a sorbent and a method of preparing the same that can be easily fabricated with extremely high oil uptake capacity without increasing the thickness of the sorbent.

SUMMARY

The present subject matter relates to a method of preparing a freestanding porous polypropylene thin film which, in one embodiment, includes dissolving polypropylene in an organic solvent to form a solution under reflux condition; stirring the solution for about 5 to about 30 minutes; adding a cavity forming agent to the solution and mixing the solution until the cavity forming agent is well-dispersed therein, thereby forming a well-dispersed solution; placing a solid substrate onto a spin coating holder or chuck; applying the well-dispersed solution onto the solid substrate through spin coating to form a thin film on the solid substrate; collecting excess materials of the polypropylene and the organic solvent in a drain connected to a receiver; removing the solid substrate with the thin film formed thereon from the spin coating holder or chuck; subjecting the formed thin film to post-heat; peeling the thin film off the solid substrate; and extracting the cavity forming agent from the peeled thin film by washing the peeled thin film in an aqueous or nonaqueous solvent, thereby obtaining a freestanding porous polypropylene thin film with cavities, macro-voids, and micropores.

In an embodiment, the organic solvent can be selected from the group consisting of p-xylene, m-xylene, o-xylene, an isomeric mixture of xylenes, toluene, other compatible aromatic hydrocarbons, and a combination thereof.

In another embodiment, the dissolving polypropylene step includes dissolving the polypropylene and the organic solvent in a round-bottomed flask and connecting the round-bottomed flask to a reflux condenser to avoid loss of the organic solvent.

In a further embodiment, the cavity forming agent can be selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a combination thereof; and wherein a size of the cavity forming agent can range from about 3 µm to about 200 µm.

In an embodiment, the solid substrate can be selected from the group consisting of glass, copper, silicon, alumina, and other metal surfaces.

In some embodiments, the solid substrate is not preheated prior to placing the solid substrate onto the spin coating holder or chuck, and a viscosity of the polypropylene can be between about 1 and about 120 gm/ml to obtain small cavity openings of between about 50 µm and about 100 µm.

In some embodiments, the solid substrate is preheated to a temperature range of about 30° C. to about 160° C. prior to placing the solid substrate onto the spin coating holder or chuck, and a viscosity of the polypropylene can be between about 120 and about 300 gm/ml to obtain large cavity openings of between about 100 µm and about 190 µm.

In some embodiments, the spin coating can occur for about 1 minute to about 10 minutes and can be conducted at a speed of about 100 rpm to about 6000 rpm.

In some embodiments, the formed thin film can be subject to the post-heat occurs for about 5 seconds to about 30 minutes and can be conducted at a temperature of about 20° C. to about 170° C.

In some embodiments, the aqueous solvent can be selected from the group consisting of pure water, distilled water, deionized water, acidic aqueous solution, basic aqueous solution, and a buffer; and the nonaqueous solvent can be selected from the group consisting of any inorganic acidic solvent or basic solvent, any organic solvent, ionic liquids, and a mixture of organic and inorganic solvents.

In some embodiments, the organic solvent can be added to the solution in a ratio of the polypropylene polymer to the organic solvent of about 1 mg/ml to about 200 mg/ml.

In some embodiments, the cavity forming agent can be added to the solution in a ratio of the polypropylene to the cavity forming agent of about 1:0 w/w % to about 1:4 w/w %.

In some embodiments, the macro-voids can be formed by conducting the spin coating at a speed above about 600 rpm to obtain macro-void dimensions of between about 10 μm and about 200 μm.

The freestanding porous polypropylene thin film can be self-supporting, free of a support or a substrate or a wall surface in some embodiments.

In some embodiments, the freestanding porous polypropylene thin film can be laminated with a layer of superhydrophobic coating using a chemical vaporization technique or a physical vaporization technique to increase hydrophobicity and to absorb oil only.

In some embodiments, the freestanding porous polypropylene thin film can be laminated with a polypropylene fabric made up of fibers to provide support and further enhance strength and reusability of the freestanding porous polypropylene thin film.

The freestanding porous polypropylene thin film can be used as an oil sorbent in some embodiments.

In further embodiments, the present subject matter relates to a freestanding porous polypropylene thin film prepared according to the method as described herein.

In an embodiment, the freestanding porous polypropylene thin film can have about 400 to about 700 swellable cavities per $cm^2$.

In a further embodiment, the present subject matter relates to a method for mitigating oil spills from water, the method including: providing a supply of the freestanding porous polypropylene thin film of claim 18 as a roll, said freestanding porous polypropylene thin film having a density less than water; deploying a certain length of said freestanding porous polypropylene thin film onto an area to be protected from oil; exposing the area to be protected from oil to oil; removing the deployed freestanding porous polypropylene thin film, now containing oil; and mechanically squeezing the freestanding porous polypropylene thin film-containing oil to recover at least 98% of the oil contained therewith, permitting the freestanding porous polypropylene thin film to be reused in the method for mitigating oil spills with about 98% oil sorption efficiency.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

The term "porous" as used herein refers to a plurality of pores provided in a thin film. Further, the pores may or may not penetrate through the thin film. A porous thin film may have penetrating pores and non-penetrating pores.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method for preparing a freestanding porous polypropylene thin film which includes dissolving polypropylene in an organic solvent to form a solution under reflux condition; stirring the solution for about 5 to about 30 minutes; adding a cavity forming agent to the solution and mixing the solution until the cavity forming agent is well-dispersed therein, thereby forming a well-dispersed solution; placing a solid substrate onto a spin coating holder or chuck; applying the well-dispersed solution onto the solid substrate through spin coating to form a thin film on the solid substrate; collecting excess materials of the polypropylene and the organic solvent in a drain connected to a receiver; removing the solid substrate with the thin film formed thereon from the spin coating holder or chuck; subjecting the formed thin film to post-heat; peeling the thin film off the solid substrate; and extracting the cavity forming agent from the peeled thin film by washing the peeled thin film in an aqueous or nonaqueous solvent, thereby obtaining a freestanding porous polypropylene thin film with cavities, macro-voids, and micropores.

In an embodiment, the organic solvent can be selected from the group consisting of p-xylene, m-xylene, o-xylene, an isomeric mixture of xylenes, toluene, other compatible aromatic hydrocarbons, and a combination thereof.

In another embodiment, the dissolving polypropylene step can include dissolving the polypropylene and the organic solvent in a round-bottomed flask and connecting the round-bottomed flask to a reflux condenser to avoid loss of the organic solvent.

In a further embodiment, the cavity forming agent can be selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a combination thereof; and wherein a size of the cavity forming agent can range from about 3 μm to about 200 μm.

In an embodiment, the solid substrate can be selected from the group consisting of glass, copper, silicon, alumina, and other metal surfaces.

In some embodiments, the solid substrate is not preheated prior to placing the solid substrate onto the spin coating holder or chuck, and a viscosity of the polypropylene can be between about 1 and about 120 gm/ml to obtain small cavity openings of between about 50 μm and about 100 μm.

In some embodiments, the solid substrate is preheated to a temperature range of about 30° C. to about 160° C. prior to placing the solid substrate onto the spin coating holder or chuck, and a viscosity of the polypropylene can be between about 120 gm/ml and about 300 gm/ml to obtain large cavity openings of between about 100 μm and about 190 μm.

In some embodiments, the spin coating can occur for about 1 minute to about 10 minutes and can be conducted at a speed of about 100 rpm to about 6000 rpm.

In some embodiments, the formed thin film is subject to the post-heat occurs for about 5 seconds to about 30 minutes and is conducted at a temperature of about 20° C. to about 170° C.

In some embodiments, the aqueous solvent can be selected from the group consisting of pure water, distilled water, deionized water, acidic aqueous solution, basic aqueous solution, and a buffer; and the nonaqueous solvent can be selected from the group consisting of any inorganic acidic solvent or basic solvent, any organic solvent, ionic liquids, and a mixture of organic and inorganic solvents.

In some embodiments, the organic solvent can be added to the solution in a ratio of the polypropylene polymer to the organic solvent of about 1 mg/ml to about 200 mg/ml.

In some embodiments, the cavity forming agent can be added to the solution in a ratio of the polypropylene to the cavity forming agent of about 1:0 w/w % to about 1:4 w/w %.

In some embodiments, the macro-voids can be formed by conducting the spin coating at a speed above about 600 rpm to obtain macro-void dimensions of between about 10 μm and about 200 μm.

The freestanding porous polypropylene thin film can be self-supporting, free of a support or a substrate or a wall surface in some embodiments.

In some embodiments, the freestanding porous polypropylene thin film can be laminated with a layer of superhydrophobic coating using a chemical vaporization technique or a physical vaporization technique to increase hydrophobicity and to absorb oil only.

In some embodiments, the freestanding porous polypropylene thin film can be laminated with a polypropylene fabric made up of fibers to provide support and further enhance strength and reusability of the freestanding porous polypropylene thin film.

The freestanding porous polypropylene thin film can be used as an oil sorbent in some embodiments.

In certain embodiments, the following stages of the present processes may be adopted to achieve desirable films:

Stage 1

Factors Affecting the Size of the Cavity Opening

Cavity openings can range between about 50 μm and about 190 μm, with small cavity openings ranging between about 50 μm and about 100 μm and large cavity openings ranging between about 100 μm and about 190 μm. For the large cavity openings, the solid substrate should be preheated, and for the small cavity openings, the solid substrate is not required to be preheated. For the large cavity openings, the contact area of the cavity forming agent with the surface of the solid substrate should be high. It can be achieved by using a cubic or cuboid-shaped cavity forming agent. For the small cavity openings, the contact area of the cavity forming agent with the surface of the solid substrate should be small, which can be achieved by using a spherical-shaped cavity forming agent. For the large size cavity openings, the viscosity of the polymer solution should be high ranging between about 120 gm/ml and about 300 gm/ml. For the small cavity openings, the viscosity of the polymer solution should be low ranging between about 1 mg/ml and about 120 mg/ml.

Factors Affecting the Size of Macro-Voids

The macro-voids are created when the centrifugal forces overcome the retention forces of the polymer. These centrifugal forces are caused by the combination of two forces created by the mass of the cavity-forming agent and the speed of the rotation of the spin coating holder or chuck. The retention forces are due to the weight of the polymer as well as intermolecular interactions.

For larger macro-voids ranging between about 70 μm and about 200 μm, the ratio of polymer to the cavity forming agent should be small ranging between about 1:0 w/w % and about 1:1 w/w %. For smaller macro-voids ranging between about 10 μm and about 70 μm, the ratio of the polymer to the cavity forming agent should be high ranging between about 1:1 w/w % and about 1:4 w/w %. For the larger macro-voids, the speed of the rotation should be high. For smaller macro-voids, the speed of rotation should be low. For larger macro-voids, the viscosity of the polymer solution should be low, and for smaller macro-voids, the viscosity of the polymer solution should be high.

Role of rpm on the Formation of Macro-Voids and Cavity Openings

For macro-voids with large cavity openings, the rpm of the spin coating holder or chuck should range from about 600 to about 900 with a preheated solid substrate. For macro-voids with small cavity openings, the rpm of the spin coating holder or chuck should range between about 600 and about 900 without preheated solid substrate. For large cavity openings with no macro-voids the rpm of the spin coating holder or chuck should range from about 300 to about 500 with a preheated solid substrate. For small cavity openings with no macro-voids the rpm of the spin coating holder or chuck should range from about 300 to about 500 without preheated solid substrate.

Stage 2

This stage is crucial to obtain a uniform thin film to ultra-thin film ranging from about 500 nm to about 100 μm. The rpm in this step ranges from about 1000 to about 3000. To achieve an ultra-thin film thickness of about 100 nm, the rpm should be in the range of about 2000 to about 3000. To achieve a thickness of about 500 nm to about 1 μm, the rpm should be in the range of about 1500 to about 2000. To achieve a thickness of about 1 μm to about 100 μm, the rpm should be in the range of about 1000 to about 1500. To achieve the lower end thickness, the preheated solid substrate should be used. The heating of the solid substrate before the spin coating is termed here as "pre-heat." The pre-heat temperature for solid substrate ranges from about 30° C. to about 160° C. but is below the boiling point of the organic solvent. To achieve higher end thickness, the solid substrate should be used at ambient temperature.

Stage 3

This step is crucial to remove the organic solvent. The rpm in this step ranges from about 3000 to about 6000. The excess polymer and the organic solvent are collected from the drain connected to the vacuum and recycled.

After the completion of spin coating, the solid substrate with thin film is detached from the chuck or spin coater.

The solid substrate with the polymer thin film may or may not be heated to a temperature up to the melting point of the polymer or above. The heating of solid substrate with thin film after the spin coating is termed here as "post-heat." The post-heat treatment can range from about 20° C. to about 160° C. or at a temperature up to the melting point of polymer(s) or above for a time range from about 5 seconds to about 30 minutes.

The post-heated thin film can be peeled off easily and effortlessly, resulting in an independent, freestanding, strong, and porous thin film without any support.

The post-heated thin films can be washed to extract the cavity forming agent using aqueous or nonaqueous solvent, thereby obtaining a porous thin film.

The aqueous solution can be pure water, distilled water, deionized water, acidic aqueous solution, basic aqueous solution, buffers. Nonaqueous solution can be any inorganic acidic solvent or basic solvent, or any organic solvent, ionic liquids, or a mixture of organic and inorganic solvents.

The organic solvent used can be p-xylene, m-xylene, and o-xylene, an isomeric mixture of xylenes, toluene, and other compatible aromatic hydrocarbons.

The polyolefin ratio to organic solvent can range from about 1 mg/ml to about 300 mg/ml.

The cavity-forming agent used in the polymer solution could be sodium chloride and is not limited to other components, including mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and the like.

The proportion of polymer to cavity forming agent can be in the range of about 1:0 w/w % to about 1:4 w/w %.

The solid substrate may include glass, copper, silicon, alumina, or other metal surfaces. The solid surface temperature can range from about 0° C. to about 130° C. or the temperature below the boiling point of the organic solvent.

In an embodiment, the size of the cavity forming agent could be in the range of about 3 μm and about 200 μm, with small cavity forming agent ranging between about 3 μm and about 70 μm and large cavity forming agent ranging between about 70 μm and about 200 μm. Or the size of the cavity forming agent could be greater than the size of the targeted thickness of the thin film.

In another embodiment, the area of the thin film can range from about 1 cm 2 to 1296 cm$^2$, or more, and the diameter of the film can range from about 1 cm to about 36 cm, or more.

In a further embodiment, the size of the cavity can depend on the dimension of the cavity forming agent and can range from about 3 μm to about 200 μm.

Any dimension as used herein in this regard can refer to length and/or breadth and/or depth/height.

Figure 1:
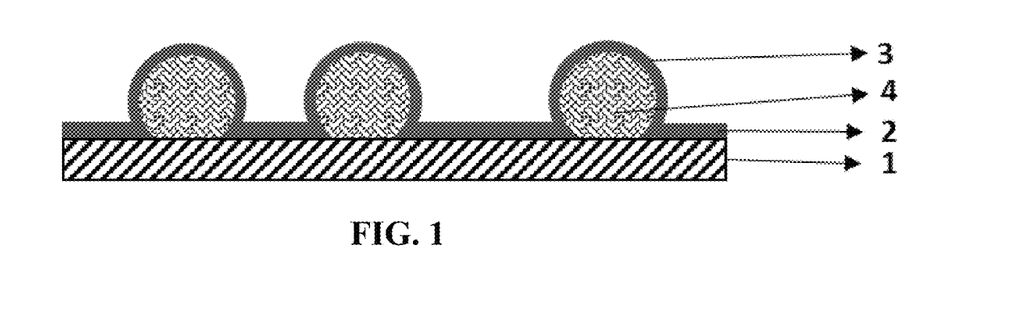
FIG. 1 is a schematic representation of a cross-sectional view of the porous thin film with cavities before peeling off the substrate.

FIG. 1 shows a porous thin film made of polypropylene which was prepared using the spin coating technique. The porous thin film 2 with prefilled cavities 3 with cavity forming agent 4 resting on a substrate 1. The thickness of the thin film 2 can range between 2 μm and 100 μm or, in certain embodiments, between 2 μm and 20 μm. The dimension of the cavity forming agent can range from 0.1 μm to 200 μm or, in certain embodiments, from 150 μm to 200 μm. The height of the cavity forming agent can range from 0.1 μm to 200 μm or, in certain embodiments, from 150 μm to 200 μm. Micropores can be through pores and can range from 0.5 μm to 10 μm. Micropores are formed by the removal of organic solvent. When a polymer solution is poured and rotated, the organic solvent is removed/expelled from the polymer surface creating phase-separated regions, these phase-separated regions on heating forms the micropores. The thin porous film on the substrate prepared using the spin coating method prefilled with cavity forming agent is not yet peeled off. The solid substrate can be a glass surface or metal surface.

Figure 2:
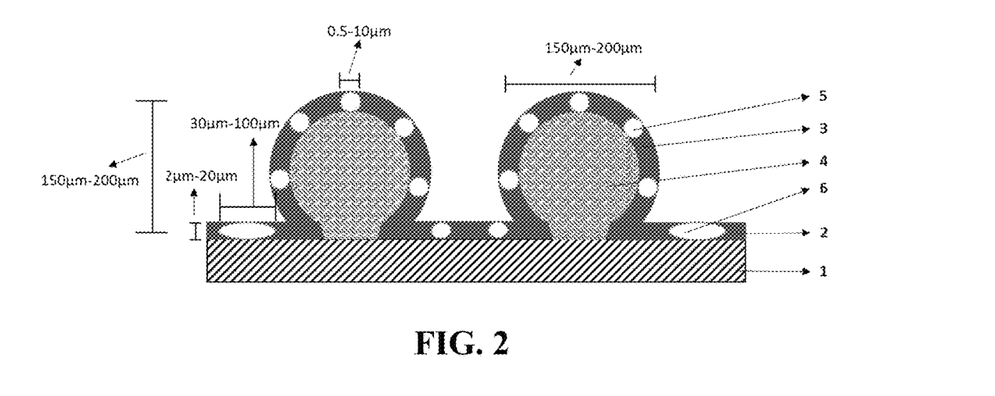
FIG. 2 is a schematic representation of a cross-sectional view of a porous thin film with micropores, macro-voids, and prefilled cavities with cavity forming agent on a solid substrate.

FIG. 2 shows a porous thin film made of polypropylene was prepared using the spin coating technique. The porous thin film 2 with prefilled cavities 3 with cavity forming agent 4 resting on a substrate 1 has a thickness ranging between 2 μm and 100 μm or, in certain embodiments, between 2 μm and 20 μm. The dimension of the cavity forming agent can range from 0.1 μm to 200 μm or, in certain embodiments, from 150 μm to 200 μm. The height of the cavity forming agent can range from 0.1 μm to 200 μm or, in certain embodiments, from 150 μm to 200 μm. Micropores 5 can be through pores and can range between 0.5 μm and 10 μm or, in certain embodiments, between 500 nm and 5 μm. Macro-voids 6 are through pores and can range between 10 μm-200 μm, or above, or in certain embodiments, between 30 μm to 100 μm. These macro-voids are formed near the cavities. They are formed when the initial spin coat speed is high (above 600 rpm) and when a cavity forming agent is added into the polymer solution. The size of the macro-voids is affected by the speed/rpm through which centrifugal forces are created. If macro-voids are not desired, then the initial speed of spin coat should be below 500 rpm. The thin porous film on the substrate prepared using the spin coating method prefilled with cavity forming agent is not yet peeled off.

Figure 3:
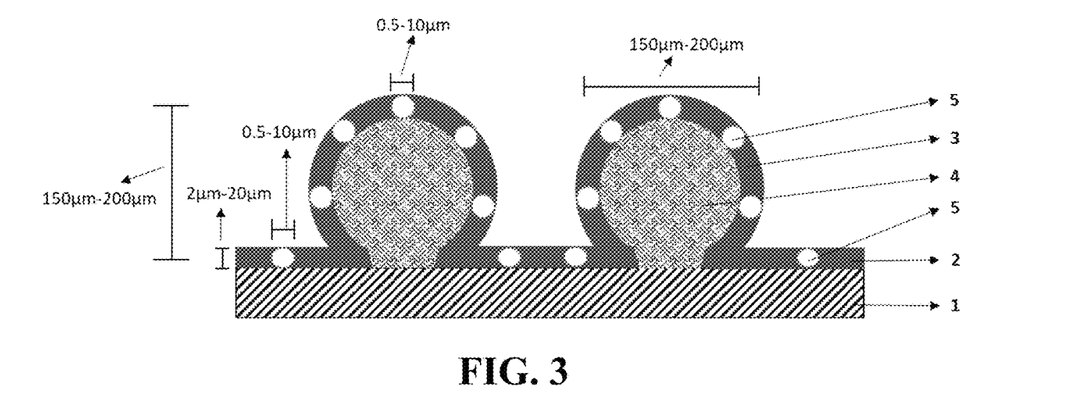
FIG. 3 is a schematic representation of a cross-sectional view of a porous thin film with micropores and prefilled cavities with cavity forming agent on a solid substrate.

FIG. 3 shows a porous thin film made of polypropylene was prepared using the spin coating technique. The porous thin film 2 with prefilled cavities 3 with cavity forming agent 4 resting on a substrate 1 has a thickness ranging between 2 μm and 100 or, in certain embodiments, between 2 μm and 20 μm. The dimension of the cavity forming agent can range from 0.1 μm to 200 μm or, in certain embodiments, 150 μm to 200 μm. The height of the cavity forming agent can range from 0.1 μm to 200 μm or, in certain embodiments, from 150 μm to 200 μm. Micropores 5 can be through pores and can range between 0.5 μm and 10 μm. The thin porous film on the substrate prepared using the spin coating method prefilled with cavity forming agent is not yet peeled off.

Figure 4:
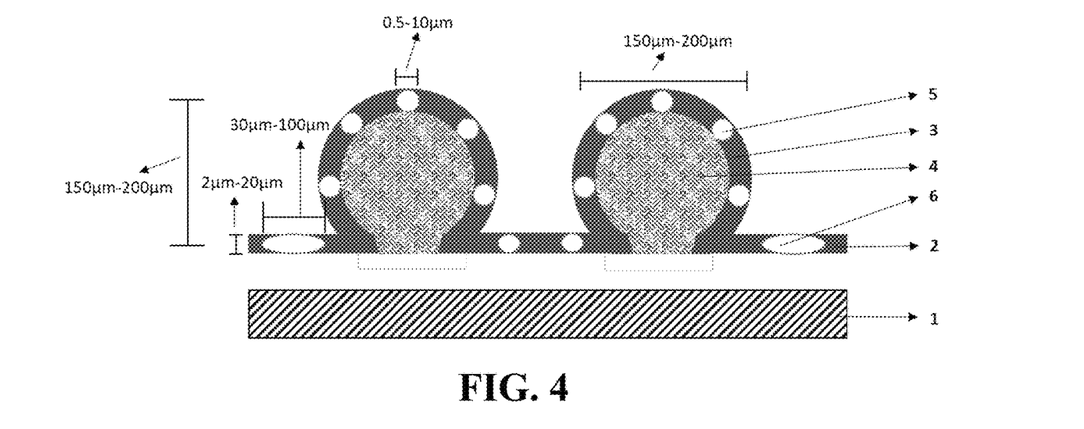
FIG. 4 is a schematic representation of a cross-sectional view of a freestanding porous thin film with micropores, macro-voids, and prefilled cavities with cavity forming agent peeled off and separated from the solid substrate.

FIG. 4 shows a porous thin film made of polypropylene was prepared using the spin coating technique. The porous thin film 2 with prefilled cavities 3 with cavity forming agent 4 separated from a substrate 1. The thickness of the thin film 2 can range between 2 μm and 100 μm or, in certain embodiments, between 2 μm and 20 μm. The dimension of the cavity forming agent can range from 0.1 μm to 200 μm or, in certain embodiments, from 150 μm to 200 μm. The height of the cavity forming agent can range from 0.1 μm to 200 μm or, in certain embodiments, from 150 μm to 200 μm. Micropores 5 can be through pores and can range between 500 nm and 10 μm. Macro-voids 6 can range from 10 μm to 200 μm, or above, or in certain embodiments, from 30 to 100 μm. The thin porous film with cavity forming agent was separated from the substrate after heating by peeling off using a tweezer. The solid substrate can be a glass surface or metal surface. The glass substrate is heated to a temperature up to the melting point of the polymer, or above, or in certain embodiments, from 130° C. to 170° C. After heating, the thin film can be peeled off using a tweezer resulting in a freestanding thin film without any structure collapse and can be independently held without any support either on complex assistance or individual microporous aid. It is noted that the post-heated thin films prepared through spin coating have a mechanical tensile strength of 1 MPa-60 MPa, or above, or in certain embodiments, 8 MPa-15 MPa.

Figure 5:
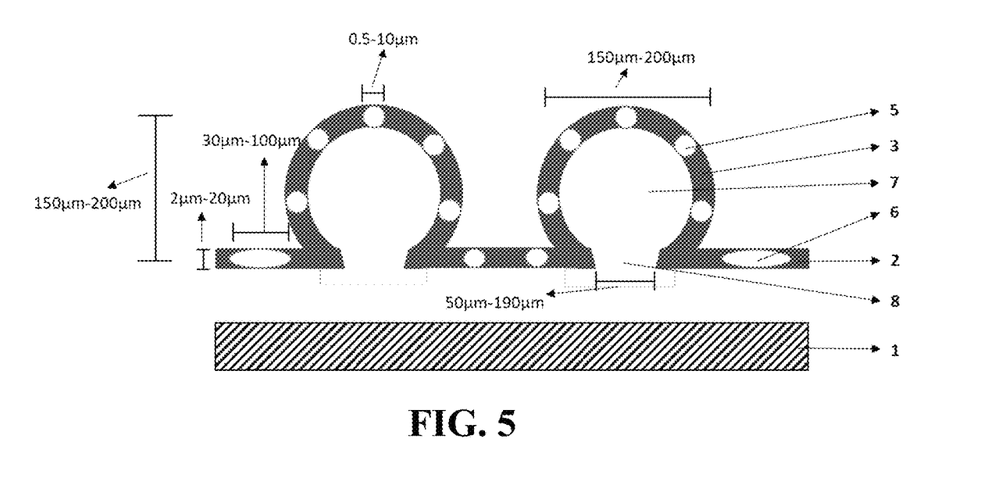
FIG. 5 is a schematic representation of a cross-sectional view of a freestanding porous thin film with micropores, macro-voids, and empty cavities.

FIG. 5 shows a porous thin film made of polypropylene was prepared using the spin coating technique. The porous thin film 2 with empty cavities 7 was prepared through spin coating. The peeled layer was washed in water to achieve a thin film with empty cavities. The thickness of the thin film 2 can range between 2 μm and 100 μm or, in certain embodiments, between 2 μm and 20 μm. The volume of the cavities can be approximately 0.008 mm$^3$ or, in certain embodiments, ranging between 150 μm and 200 μm. The dimension of the cavity forming agent can range from 0.1 μm to 200 μm or, in certain embodiments, 150 μm to 200 μm. The height of the cavity forming agent can range from 0.1 μm to 200 μm or, in certain embodiments, 150 μm to 200 μm. The thin film 2 was washed in distilled water to remove cavity forming agents by dissolving them in water, creating sponge-like cavities 7. Micropores 5 can be through pores and can range between 500 nm and 10 μm. Macro-voids 6 can range between 30 μm and 100 μm. The cavity opening 8 can range between 50 µm and 190 µm. The thin porous film with cavity forming agent was separated from the substrate by peeling off using a tweezer. The solid substrate can be a glass surface or metal surface. The glass substrate is heated to a temperature up to the melting point of the polymer, or above, or in certain embodiments, from 130° C. to 170° C. After heating, the thin film can be peeled off using a tweezer resulting in a freestanding thin film without any structure collapse and can be independently held without any support either on complex assistance or individual microporous aid. It is noted that the post-heated thin films prepared through spin coating have a mechanical tensile strength of 1 MPa to 60 MPa, or above, or in certain embodiments, 8 MPa to 15 MPa.

Figure 6:
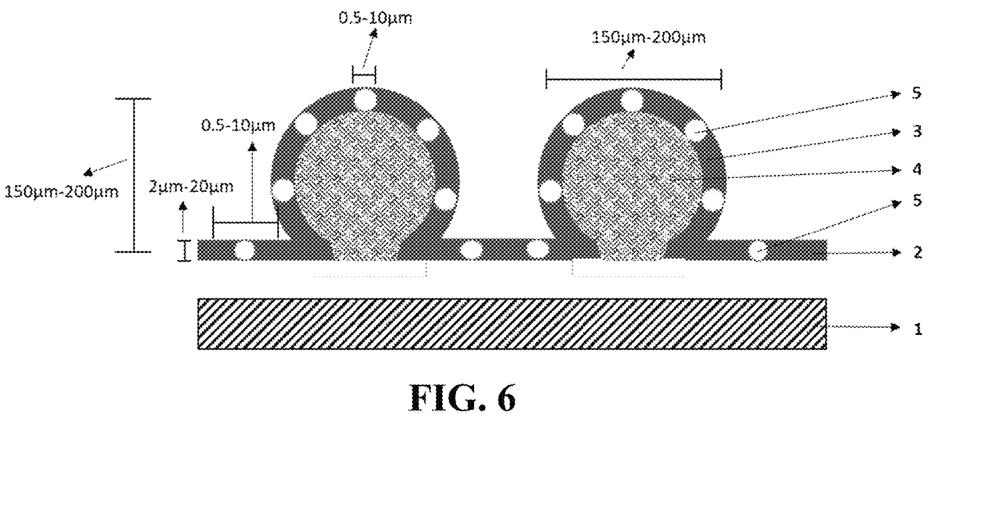
FIG. 6 is a schematic representation of a cross-sectional view of a freestanding porous thin film with micropores and prefilled cavities with cavity forming agent peeled off and separated from the solid substrate.

FIG. 6 shows a porous thin film made of polypropylene was prepared using the spin coating technique. The porous thin film 2 with prefilled cavities 3 with cavity forming agent 4 separated from a substrate 1. The thickness of the thin film 2 can range between 2 µm and 100 µm or, in certain embodiments, between 2 µm and 20 µm. The dimension of the cavity forming agent can range from 0.1 µpm to 200 µm or, in certain embodiments, 150 µm to 200 µm. The height of the cavity forming agent can range from 0.1 µm to 200 µm or, in certain embodiments, from 150 µm to 200 µm. Micropores 5 can be through pores and can range between 500 nm and 10 µm. The thin porous film with cavity forming agent was separated from the substrate after heating by peeling off using a tweezer. The solid substrate can be a glass surface or metal surface. The glass substrate is heated to a temperature up to the melting point of the polymer, or above, or in certain embodiments, from 130° C. to 170° C. After heating, the thin film can be peeled off using a tweezer resulting in a freestanding thin film without any structure collapse and can be independently held without any support either on complex assistance or individual microporous aid. It is noted that the post-heated thin films prepared through spin coating have a mechanical tensile strength of 1 MPa to 60 MPa, or above, or in certain embodiments, 8 MPa to 15 MPa.

Figure 7:
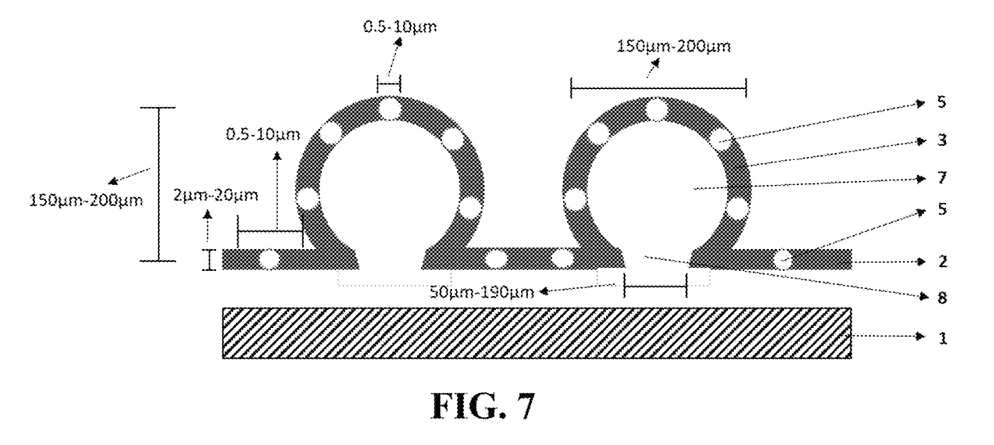
FIG. 7 is a schematic representation of a cross-sectional view of a freestanding porous thin film with micropores and empty cavities.

FIG. 7 shows a porous thin film made of polypropylene prepared using the spin coating technique. The porous thin film 2 with empty cavities 7 was prepared through spin coating. the peeled layer from FIG. 6 was washed in water to achieve empty cavities. The thickness of the thin film 2 can range between 2 µm and 100 µm or, in certain embodiments, between 2 µm and 20 µm. The volume of the cavities can range between 150 µm and 200 µm. The dimension of the cavity forming agent can range from 0.1 µm to 200 µm or, in certain embodiments, from 150 µm to 200 µm. The height of the cavity forming agent can range from 0.1 µm to 200 µm or, in certain embodiments, 150 µm to 200 µm. The thin film 2 was washed in distilled water to remove cavity forming agents by dissolving them in water, creating sponge-like cavities 7. Micropores 5 can be through pores and can range between 500 nm and 10 µm. The cavity opening 8 can range between 50 µm and 190 µm. The thin porous film with cavity forming agent was separated from the substrate after heating by peeling off using a tweezer. The solid substrate can be a glass surface or metal surface. The glass substrate is heated to a temperature up to the melting point of the polymer, or above, or in certain embodiments, from 130° C. to 170° C. After heating, the thin film can be peeled off using a tweezer resulting in a freestanding thin film without any structure collapse and can be independently held without any support either on complex assistance or individual microporous aid. It is noted that the post-heated thin films prepared through spin coating have a mechanical tensile strength of 1 MPa to 60 MPa, or above, or in certain embodiments, 8 MPa to 15 MPa.

Figure 8:
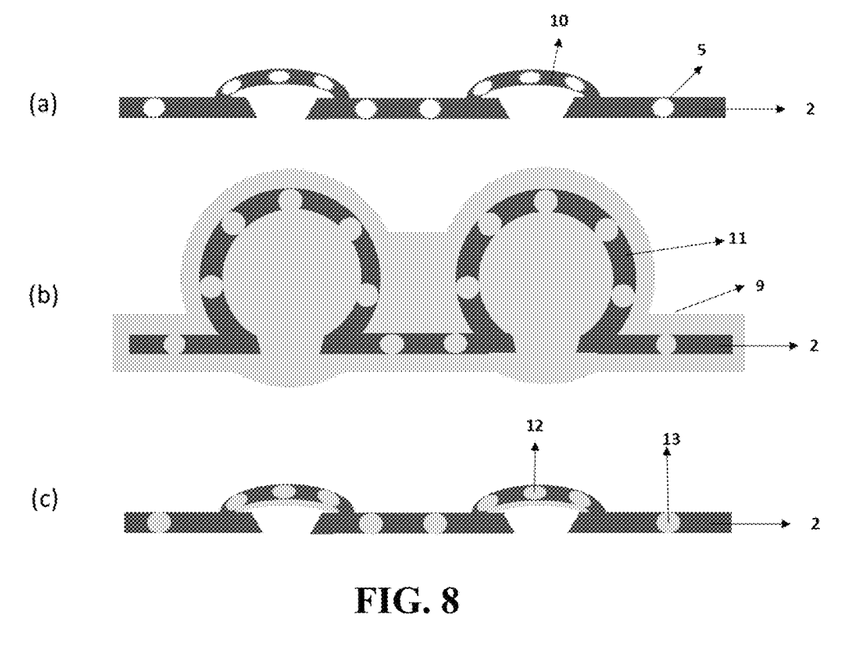
FIGS. 8A-8C are schematic representations of a porous thin film with sponge-like cavities in compressed form (FIG. 8A), after oil sorption (FIG. 8B), and after squeezing (FIG. 8C).

FIG. 8A shows the thin film 2 is in packed state with compressed cavities 10. Once it is put in oil, the micropores 5 and the compressed cavities 10 will absorb oil 9 and expands to its maximum capacity and retains good volume of oil represented as swollen cavities 11 as shown in FIG. 8B. When the oiled film was pressed or squeezed, the oil inside the cavities 12 will be extracted and very minute amount of oil is present inside the micropores 13 as shown in FIG. 8C. Further, this film can be reused for oil sorption for many a times without losing the structural integrity and structure collapse.

Figure 9:
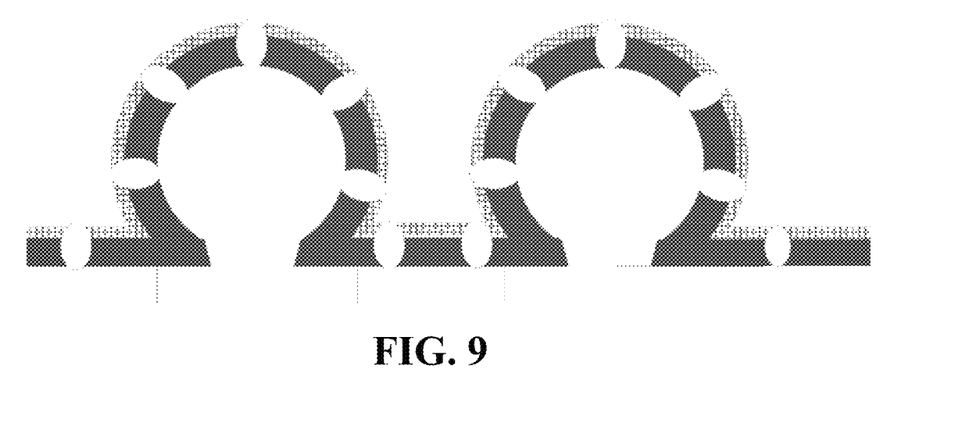
FIG. 9 is a schematic representation of thin film with cavity laminated with a superhydrophobic coating.

FIG. 9 shows a porous thin film laminated with a layer of superhydrophobic coating using chemical vaporization technique or physical vaporization technique to increase hydrophobicity and to absorb oil only. Or a porous thin film can be laminated with a polypropylene fabric made up of fibers to provide support, to further enhance the strength and reusability of the thin film.

Figure 10:
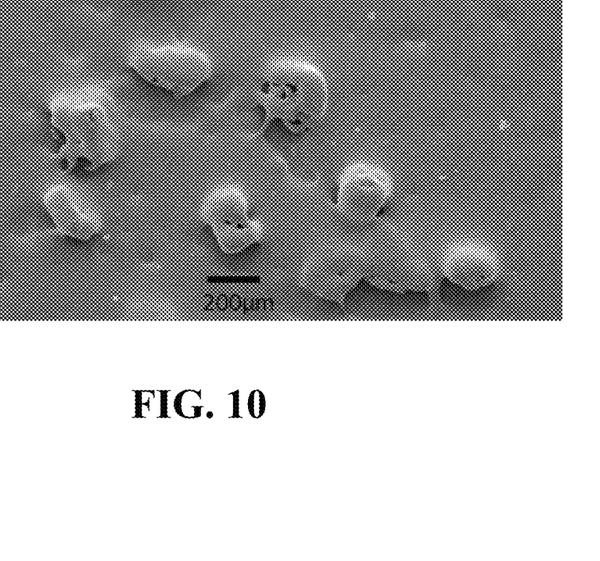
FIG. 10 is a SEM image of the thin film showing cavities.

FIG. 10 shows the porous thin film made of polypropylene with prefilled cavities, and sponge-like empty cavities was prepared through spin coating. Here, the polymer to cavity forming agent is 1:1 weight ratio. The peeled layer was washed in water to achieve empty cavities. The porous thin film and the cavities also showed micropores. The thickness of the thin film can range from 2 µm to 100 µm or, in certain embodiments, from 2 µm to 20 µm. The dimension of the cavity forming agent can range from 0.1 µm to 200 µm or, in certain embodiments, 150 µm to 200 µm. The height of the cavity forming agent can range from 0.1 µm to 200 µm or, in certain embodiments, 150 µm to 200 µm. Micropores 5 can be through pores and can range from 500 nm to 10 µm.

Figure 11:
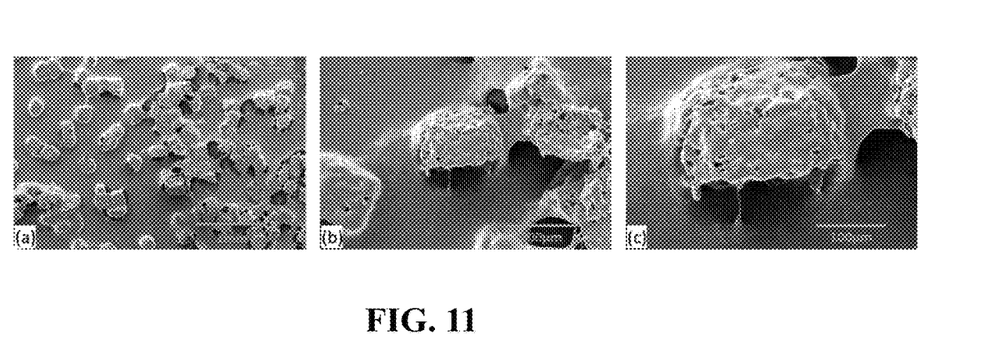
FIGS. 11A, 11B, and 11C are SEM images of the porous thin film showing micropores, macro-voids, and cavities.

FIG. 11 shows the porous thin film made of polypropylene with prefilled cavities, and empty cavities was prepared through spin coating. Here, the polymer to cavity forming agent is 1:2 weight ratio. The peeled layer was washed in water to achieve empty cavities. The porous thin film and the cavities also showed micropores and macro-voids. The thickness of the thin film can range between 2 µm and 100 µm or, in certain embodiments, between 2 µm and 20 µm. The dimension of the cavity forming agent can range from 0.1 µm to 200 µm or, in certain embodiments, from 150 µm to 200 µm. The height of the cavity forming agent can range from 0.1 µm to 200 µm or, in certain embodiments, from 150 µm to 200 µm. Micropores can be through pores and can range between 100 nm and 10 µm. Macro-voids can range between 10 µm and 200 µm or, in certain embodiments, from 30 µm to 100 µm.

Figure 12:
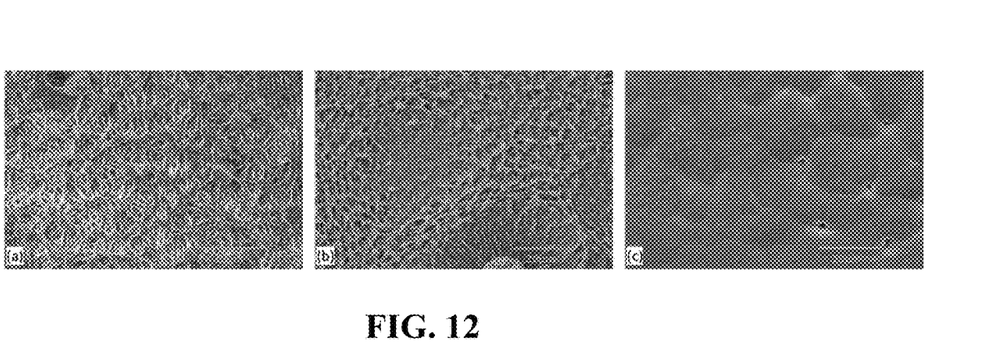
FIGS. 12A, 12B, and 12C are SEM images of the porous thin film showing micropores at different temperatures.

FIGS. 12A-12C depict SEM images showing polypropylene thin film microporous structure at different temperature. FIG. 12A represents polypropylene thin film porous network prepared using spin coating and the film is not subjected to heat (Table 2, SN 1). FIG. 12B represents PP thin film microporous structure that start to melt when kept at 160° C. for 10 minutes (Table 2, SN 5). FIG. 12C represents PP thin film that is heated at 165° C. for 5 minutes closing most of the porous structure and enhancing the tensile strength (Table 2, SN 8).

Figure 13:
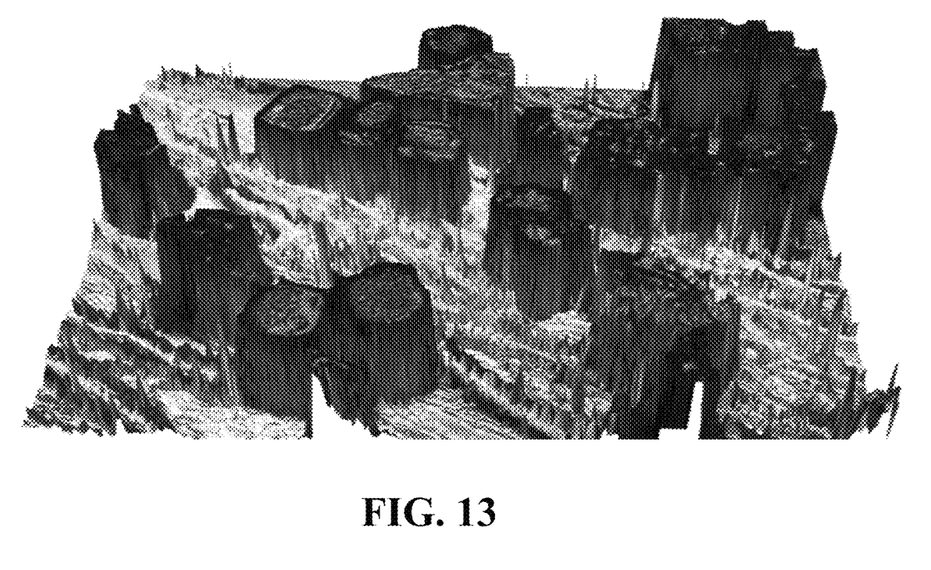
FIG. 13 is a 3D image taken by profilometry showing cavities.

FIG. 13 depicts 3D images of the PP polymer porous thin film showing cavities and micropores using a profilometer. In FIG. 13, a porous thin film with cavities from the top surface and the bottom surface is depicted. The porous thin film was made of polyethylene with prefilled cavities and empty cavities was prepared through spin coating. The peeled layer was washed in water to remove salt and to achieve empty cavities. The dimension of the cavity forming agent particles ranges between 3 µm and 200 µm or, in certain embodiments, 150 µm to 200 µm. The volume of the cavity can range between 9 µm³ and 0.0027 mm³ or, in certain embodiments, between 0.00375 mm³ and 0.008 mm³. The thickness of the thin film can range in between 2 µm and 100 µm or, in certain embodiments, between 2 µm and 20 µm. The dimension of the cavity forming agent can range from 0.1 µm to 200 µm or, in certain embodiments, from 150 µm to 200 µm. The height of the cavity forming agent can range from 0.1 µm to 200 µm or, in certain embodiments, 150 µm to 200 µm. Micropores can be through pores and can range between 500 nm and 10 µm. Macro-voids can range between 10 µm and 200 µm or, in certain embodiments, from 30 µm to 100 µm.

Figure 14:
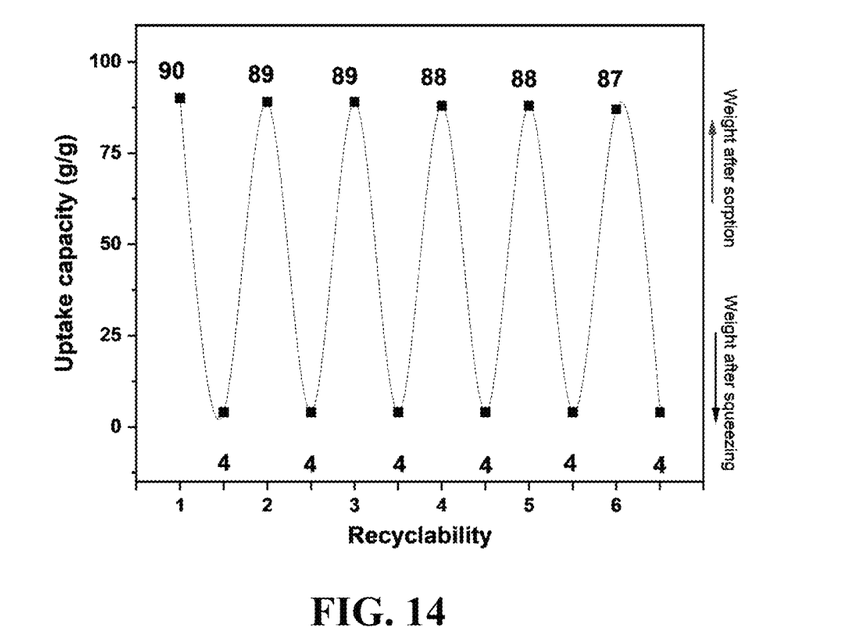
FIG. 14 shows a recyclability plot for PP thin film in oil sorption.

FIG. 14. shows recyclability plot for PP thin film in oil sorption. The recyclability of the oil sorption shown in FIG. 14 was performed using Example 2.

The following examples relate to various methods of manufacturing the specific embodiments herein and application of the same, as described herein.

EXAMPLES

Example 1

PP (60 mg/ml) Thin Film (PP: Salt 1:1)

3 g of PP is taken in a round-bottomed flask. 50 ml of p-xylene is added to the round-bottomed flask and allowed to stir. The reaction mixture is heated at 130° C. till a clear solution is achieved. Usually, the polymer is dissolved in 15-30 minutes. The round-bottomed flask is connected to a reflux condenser to avoid organic solvent loss. Add 3 g of sodium chloride size ranging between 150 µm and 200 µm. Allow the polymer reaction mixture to stir till a uniform dispersed solution is achieved.

Simultaneously, a plain glass plate of size 5 cm×5 cm is heated to 120° C. Then it is placed on the customized spin coater chuck and the polymer reaction mixture is poured onto the hot glass surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The solid substrate is removed from the chuck and placed in a hot air oven for 25 minutes at 160° C. Then the thin film is peeled off easily using a tweezer.

Wash the film in water for 5-15 minutes to remove the cavity forming agent, sodium chloride, to obtain a macro-porous thin film layer. It is to note that the reaction hotplate-stirrer and spin coater are placed side-by-side to avoid solvent exposure to the environment, and the whole setup is kept inside the fume hood. The spin coater drain is connected to a receiver.

The thickness for the thin film achieved through this composition is 5 µm. The strength obtained for this film is 10 MPa. The thickness and strength are shown in Table 1. The SEM images in FIG. 10 are of this example. As per the requirement of the end-user, the as-prepared thin film sorbent can be modified, as presented in Table 1. The optimized values are obtained with 34% porosity, the thickness of 7 µm and tensile strength of 5 MPa. The value of 5 MPa is sufficient to be used in real-time applications of the sorbent.

TABLE 1

Tensile Strength comparison for different polypropylene formulations.

| Example | Sample composition PP* in Xylene [mg/ml] | PP to cavity forming agent (NaCl) ratio (w/w %) | Thickness (µm) | Tensile Strength (MPa) |
| --- | --- | --- | --- | --- |
| 1 | PP [60 mg/ml] | 1:1 | 5 | 10 |
| 2 | PP [60 mg/ml] | 1:2 | 5 | 7 |
| 3 | PP [90 mg/ml] | 1:2 | 6 | 9 |

*The thin films are heated to 150° C. for 20 minutes.

Example 2

PP (60 mg/ml) Thin Film (PP: Salt 1:2)

3 g of PP are taken in a round-bottomed flask. 50 ml of isomeric mixture of xylenes is added to the round-bottomed flask and allowed to stir. The reaction mixture is heated at 130° C. till a clear solution is achieved. Usually, the polymer is dissolved in 15-30 minutes. The round-bottomed flask is connected to a reflux condenser to avoid organic solvent loss. Add 6 g of sodium chloride size ranging between 150 µm and 200 µm. Allow the polymer reaction mixture to stir till a uniform dispersed solution is achieved.

Simultaneously, a plain glass plate of size 5 cm×5 cm is heated to 120° C. Then it is placed on the customized spin coater chuck and the polymer reaction mixture is poured onto the hot solid surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The solid substrate is removed from the chuck and placed in a hot air oven for 25 minutes at 160° C. Then the thin film is peeled off easily using a tweezer.

Wash the film in water for 5 minutes to remove the cavity forming agent, sodium chloride, to obtain a macro-porous thin film layer. It is to note that the reaction hotplate-stirrer and spin coater are placed side-by-side to avoid solvent exposure to the environment, and the whole setup is kept inside the fume hood. The spin coater drain is connected to a receiver and excess polymer and xylene is collected.

The thickness for the thin film achieved through this composition is 5 µm. The strength obtained for this film is 7 MPa. The thickness and strength are shown in Table 1. PP was taken according to the above formulation and thin films on a glass substrate were prepared. Then these thin films were subjected to post-heat at varying temperatures.

The tensile strength and porosity for these samples that can be used as freestanding thin films are measured. These values are shown in Table 1 Film 2 and Table 2 Film 7. The SEM images shown in FIG. 11 were prepared through this combination.

TABLE 2

Porosity vs Strength comparison for PP porous thin film (Example 2)

| Film | Porosity % | [1]Thickness (μm) | [2]Temperature °C. | Time min | Strength MPA |
|---|---|---|---|---|---|
| 1[a] | ~82 | 16 | 25 | 0 | [3]ND |
| 2 | ~77 | 14 | 150 | 5 | ND |
| 3 | ~72 | 12 | 150 | 10 | 1 |
| 4 | ~68 | 10 | 150 | 25 | 1 |
| 5 | ~66 | 9 | 160 | 10 | 2 |
| 6[b] | ~34* | 7 | 160 | 20 | 5 |
| 7 | 7 | 5 | 160 | 25 | 7 |
| 8[c] | <3 | 5 | 165 | 5 | 8 |

[1]initial weight of the thin film was 5 mg.
[2]Temperature should be close to the melting point of the polymer. For PP, Temp is 160° C.
[3]Not determined: the polymer is in the form of fibers and cannot be considered as a freestanding thin film,
*Pore size ranges from 0.5 μm to 4 μm.

The oil sorption studies including dripping kinetics, saturation kinetics, and comparison with commercial sorbents are shown in Table 3, 4, 5 respectively. They were done with the thin films made from Example 2.

TABLE 3

Retention capacity of example 2 thin film using engine oil

| Film | Dripping time (min) | Oil uptake capacity[1] (g/g) |
|---|---|---|
| 1 | 0 | 140 |
| 2 | 0.5 | 115 |
| 3 | 1 | 105 |
| 4 | 2 | 95 |
| 5 | 5 | 90 |
| 6 | 15 | 90 |

[1]Oil uptake capacity with an error of ±10%

TABLE 4

Saturation capacity profile of example 2 thin film using engine oil

| Film | Saturation time (min) | Oil uptake capacity* (g/g) | Oil uptake capacity** (g/g) |
|---|---|---|---|
| 1 | 0.5 | 60 | 45 |
| 2 | 1 | 95 | 65 |
| 3 | 2 | 120 | 80 |
| 4 | 5 | 140 | 90 |
| 5 | 15 | 140 | 90 |

*Oil uptake measured immediately after taking out the film from an oil bath
**Oil uptake measured after equilibrium is reached (after dripping for 5 mins)

TABLE 5

Comparison of oil uptake capacity with commercial sorbents using engine oil.

| S.N. | Sorbent (g/g) | 3M HP-255 (g/g) | Chemtex BP9W (g/g) |
|---|---|---|---|
| 1* | 140 | 27 | 22 |
| 2** | 90 | 23 | 17 |

[1]Oil uptake capacity with an error of ±10%
*Oil uptake measured immediately after taking out the film from an oil bath
**Oil uptake measured after equilibrium is reached (after dripping for 5 mins)

Dripping kinetics is the amount of oil dripping from the thin film with respect to time. When a thin film is placed or dipped in oil, it absorbs oil till it reaches saturation. After it reaches equilibrium, the thin film is taken out, and loosely connected oil is allowed to drain from it. Initially, the oil will drip more, and as time passes, the dripping decreases, and after some time, some oil is retained by the film, and the oil is not dripped. This is termed as retention capacity of the thin film. The as-prepared thin film sorbent reaches its equilibrium uptake value after 5 minutes of dripping, i.e., after 5 minutes, there will be no more dripping of oil from the sorbent.

Saturation kinetics is the time taken by the thin film to reach a saturation point, whereafter the oil cannot be absorbed more. In short, it is the maximum capacity of the oil absorbed by the thin film with respect to time.

The as-prepared thin film sorbent reaches its saturation value within 5 minutes of sorption and comparison of our as-prepared oil sorbent film with commercial sorbents. An area of 16 cm$^2$ of 3 M and Chemtex commercial sorbents were cut and were compared with an area of 16 cm$^2$ size of thin film as shown in Table 5. The equilibrium oil uptake value of our as-prepared porous sorbent was found to be 90 g/g, which is much higher than the commercial sorbent pads made of nonwoven polypropylene fabric. The sorbent film of 16 cm$^2$ and a thickness of 2 μm was used to measure oil-water separation efficiency. Initially, the film was installed on a sintered glass filtration unit and a solution of 1000 ppm oil suspended in water was allowed to pass through the filtration unit. The results shown in Table 6 are that of Example 2. The film had a 100% oil water separation efficiency with a maximum capacity of 300 ppm per cm$^2$ of sorbent film.

TABLE 6

Oil water separation efficiency

| SN | Oil in water (ppm) | Efficiency % |
|---|---|---|
| 1 | 1000 | 40 |
| 2 | 800 | 50 |
| 3 | 600 | 66 |
| 4 | 500 | 80 |
| 5 | 400 | 90 |
| 6 | 300 | 100 |
| 7 | 200 | 100 |
| 8 | 100 | 100 |
| 9 | 1 | 100 |

The recyclability of the PP sorbent film is shown in FIG. 14 and was performed using Example 2. A sample with an area of 16 cm$^2$ and a thickness of 5 μm was taken. The sorbent was dipped in an engine oil till saturation was achieved. The film was then removed from the oil and weighed immediately. The oil uptake capacity was found to be 90 g/g. Then the sorbent was mechanically squeezed by pressing upper and lower surface to remove oil from it and weighed again. The residual uptake value was found to be 4 g/g, which suggested that some oil was retained inside the porous structure of the sorbent. The process was repeated several times as shown in FIG. 14. The oil recovery from the present sorbent was 98%.

Example 3

PP (90 mg/ml) Thin Film (PP: Salt 1:2)

4.5 g of PP is taken in a round-bottomed flask. 50 ml of isomeric mixture of xylenes is added to the round-bottomed flask and allowed to stir. The reaction mixture is heated at 130° C. till a clear solution is achieved. Usually, the polymer is dissolved in 15-30 minutes. The round-bottomed flask is connected to a reflux condenser to avoid organic solvent loss. Add 6 g of sodium chloride size ranging between 150 μm and 200 μm. Allow the polymer reaction mixture to stir till a uniform dispersed solution is achieved.

Simultaneously, a plain glass plate of size 5 cm×5 cm is heated to 120° C. Then it is placed on the customized spin coater chuck and the polymer reaction mixture is poured onto the hot glass surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The solid substrate is removed from the chuck and placed in a hot air oven for 25 minutes at 160° C. Then the thin film is peeled off easily using a tweezer.

Wash the film in water for 5 minutes to remove the cavity forming agent and sodium chloride to obtain a macro-porous thin film layer. It is to note that the reaction hotplate-stirrer and spin coater are placed side-by-side to avoid solvent exposure to the environment, and the whole setup is kept inside the fume hood.

The spin coater drain is connected to a receiver to collect excess polymer and xylene. The thickness for the thin film achieved through this composition is 6 μm. The strength obtained for this film is 9 MPa as shown in Table 1 Film 3.

It is to be understood that the present processes, compositions, and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing a porous polypropylene thin film, the method comprising:
    dissolving polypropylene in an organic solvent to form a solution under reflux condition;
    stirring the solution for about 5 to about 30 minutes;
    adding a cavity forming agent to the solution and mixing the solution until the cavity forming agent is well-dispersed therein, thereby forming a well-dispersed solution;
    placing a solid substrate onto a spin coating holder or chuck;
    applying the well-dispersed solution onto the solid substrate through spin coating to form a thin film on the solid substrate;
    collecting excess materials of the polypropylene and the organic solvent in a drain connected to a receiver;
    removing the solid substrate with the thin film formed thereon from the spin coating holder or chuck;
    subjecting the formed thin film to post-heat;
    peeling the thin film off the solid substrate; and
    extracting the cavity forming agent from the peeled thin film by washing the peeled thin film in an aqueous or nonaqueous solvent, thereby obtaining a porous polypropylene thin film with cavities, macro-voids, and micropores.

2. The method for preparing a porous polypropylene thin film of claim 1, wherein the organic solvent is selected from the group consisting of p-xylene, m-xylene, o-xylene, an isomeric mixture of xylenes, toluene, other aromatic hydrocarbons, and a combination thereof.

3. The method for preparing a porous polypropylene thin film of claim 1, wherein the porous polypropylene thin film has a tensile strength ranging from about 3 MPa to about 60 MPa and a thickness ranging from about 2 μm to about 100 μm.

4. The method for preparing a porous polypropylene thin film of claim 1, wherein the cavity forming agent is selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a combination thereof; and wherein a size of the cavity forming agent ranges from about 3 μm to about 200 μm.

5. The method for preparing a porous polypropylene thin film of claim 1, wherein the solid substrate is selected from the group consisting of glass, copper, silicon, alumina, and other metal surfaces.

6. The method for preparing a porous polypropylene thin film of claim 1, wherein the solid substrate is not preheated prior to placing the solid substrate onto the spin coating holder or chuck, and a density of the polypropylene is between about 1 and about 300 mg/ml to obtain small cavity openings of between about 50 μm and about 100 μm.

7. The method for preparing a porous polypropylene thin film of claim 1, wherein the solid substrate is preheated to a temperature range of about 30° C. to about 160° C. prior to placing the solid substrate onto the spin coating holder or chuck, and a density of the polypropylene is between about 1 mg/ml and about 300 mg/ml to obtain large cavity openings of between about 100 μm and about 190 μm.

8. The method for preparing a porous polypropylene thin film of claim 1, wherein the spin coating occurs for about 1 minute to about 10 minutes and is conducted at a speed of about 100 rpm to about 6000 rpm.

9. The method for preparing a porous polypropylene thin film of claim 1, wherein the step of subjecting the formed thin film to post-heat occurs for about 5 seconds to about 30 minutes and is conducted at a temperature of about 20° C. to about 170° C.

10. The method for preparing a porous polypropylene thin film of claim 1, wherein the aqueous solvent is selected from the group consisting of pure water, distilled water, deionized water, acidic aqueous solution, basic aqueous solution, and a buffer; and
    the nonaqueous solvent is selected from the group consisting of any inorganic acidic solvent or basic solvent, any organic solvent, ionic liquids, and a mixture of organic and inorganic solvents.

11. The method for preparing a porous polypropylene thin film of claim 1, wherein the organic solvent is added to the solution in a ratio of the polypropylene polymer to the organic solvent of about 1:1000 to about 300:1000.

12. The method for preparing a porous polypropylene thin film of claim 1, wherein the cavity forming agent is added to the solution in a ratio of the polypropylene to the cavity forming agent of about 1:0 w/w % to about 1:4 w/w %.

13. The method for preparing a porous polypropylene thin film of claim 1, wherein the macro-voids are formed by conducting the spin coating at a speed above about 600 rpm to obtain macro-void dimensions of between about 10 μm and about 200 μm.

14. The method for preparing a porous polypropylene thin film of claim 1, wherein the porous polypropylene thin film is self-supporting, free of a support or a substrate or a wall surface.

15. The method for preparing a porous polypropylene thin film of claim 1, further comprising laminating the porous polypropylene thin film with a layer of superhydrophobic coating using a chemical vaporization technique or a physical vaporization technique to increase hydrophobicity and to absorb oil only.

16. The method for preparing a porous polypropylene thin film of claim 1, further comprising laminating the porous polypropylene thin film with a polypropylene fabric made up of fibers to provide support and further enhance strength and reusability of the porous polypropylene thin film.

17. The method for preparing a porous polypropylene thin film of claim 1, wherein the porous polypropylene thin film is used as an oil sorbent.

18. A sponge like porous polypropylene thin film having a tensile strength ranging from about 3 MPa to about 60 MPa and a thickness ranging from about 2 µm to about 100 µm prepared according to the method of claim 1; wherein the porous polypropylene thin film has about 400 to about 700 swellable cavities per $cm^2$.

* * * * *